No. 761,335. PATENTED MAY 31, 1904.
J. A. SWINEHART.
VEHICLE TIRE.
APPLICATION FILED AUG. 15, 1903.
NO MODEL.
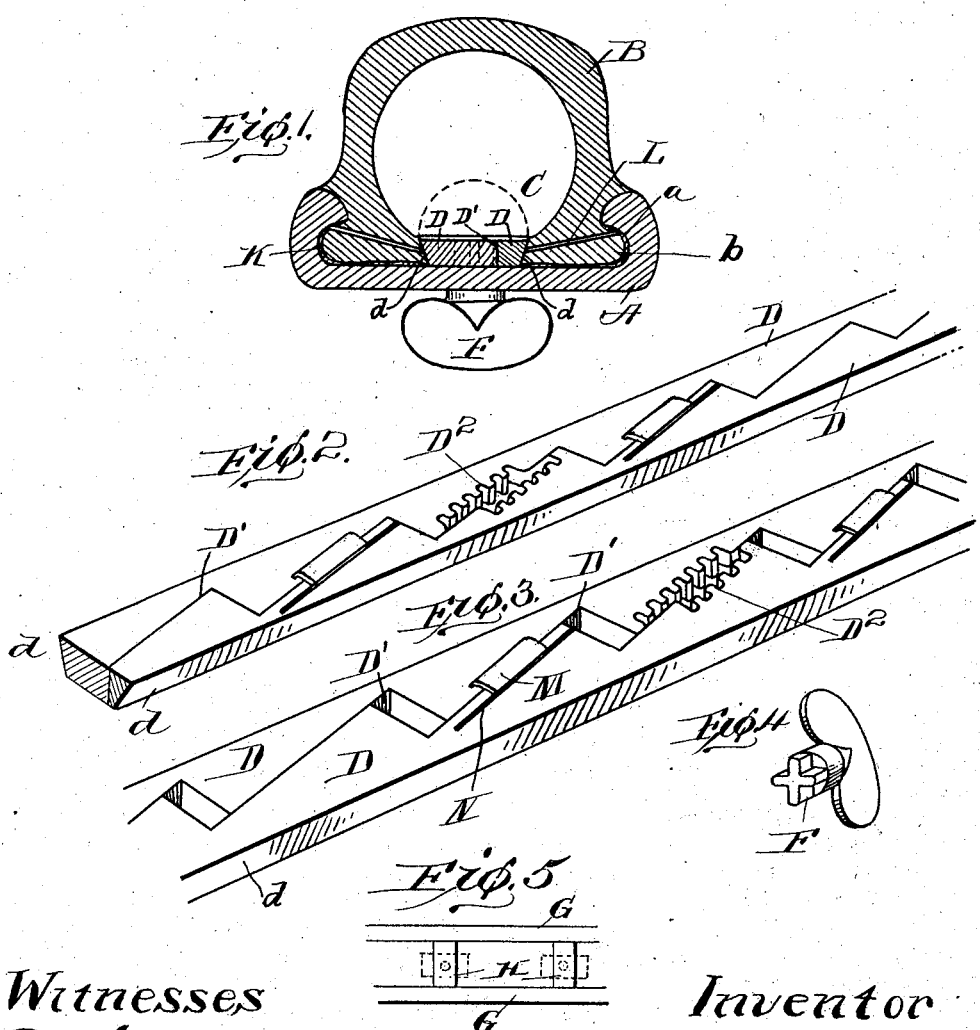

No. 761,335. Patented May 31, 1904.

UNITED STATES PATENT OFFICE.

JAMES ALLEN SWINEHART, OF AKRON, OHIO.

VEHICLE-TIRE.

SPECIFICATION forming part of Letters Patent No. 761,335, dated May 31, 1904.

Application filed August 15, 1903. Serial No. 169,659. (No model.)

*To all whom it may concern:*

Be it known that I, JAMES ALLEN SWINEHART, of Akron, in the county of Summit, State of Ohio, have invented certain new and useful Improvements in Vehicle-Tires; and I do hereby declare the following to be a full, clear, and exact description of the same, reference being had to the accompanying drawings, forming a part of this specification, and to the letters of reference marked thereon.

This invention relates to improvements in vehicle-tires such as employ a rubber or elastic tread portion or tire proper suitably held in a channeled rim, the objects of the invention being to provide a simple and highly efficient means whereby the tire or tread portion will be held in the rim with a capacity for ready removal and repair.

The invention consists in certain novel details of construction and combinations and arrangements of parts, all as will be now described, and the particular features of novelty pointed out in the appended claims.

In the accompanying drawings, Figure 1 is a cross-sectional view through a rim and tire embodying the present improvements. Fig. 2 is a perspective view of a section of the clamps for retaining the tire in the rim. Fig. 3 is a similar view with the clamps spread. Fig. 4 is a view of a key for spreading the clamps. Fig. 5 is a diagrammatic illustration of a modified arrangement.

Like letters of reference in the several figures indicate the same parts.

The letter A in the accompanying drawings indicates a rim for a wheel, which rim in cross-section is channeled on the outer face and preferably provided with undercuts or recesses $a$, the particular configuration of the rim, however, not being material, as any of the ordinary types now well known may be employed in carrying out the present invention.

The letter B indicates a tire or tread portion of rubber or other elastic material provided with suitable projections $b$ at each side adapted to fit into the recesses $a$. This tire as illustrated is of the pneumatic variety; but it may well be a solid tire or a cushion-tire, in which latter instance it would preferably have a relatively small central concavity or recess, as indicated by the dotted line C. In other words, the tire may be of the pneumatic, solid, semipneumatic, or cushion type, as desired. Within the base of the tire, and preferably adjacent the center of the rim, there are arranged clamps which may be in the form of bars D conforming to the curvature of the rim, and, if desired, extending entirely around the same. These clamps or bars D preferably have their outer edges $d$ undercut or inclined and form, with the recesses $a$, channels with undercut walls, in which channels the base portions of the tire B may be firmly secured and clamped by spreading the bars D apart. Obviously the said bars may be spread or separated so as to effect the clamping of the projections on the tire by various mechanical means, and in the preferred construction the said bars are provided or formed on their adjacent faces with a series of coöperating inclines or inclined surfaces D', which when the bars are moved in one direction with relation to each other will cause their outer faces to separate or spread transversely of the rim and tire. The angle of the inclines may be such that the parts will be retained in their adjusted position by the friction of the coacting faces, together with the friction on the rim and tire, respectively, although any ordinary locking means may be provided for retaining them in adjusted position, if so desired. As a convenient and effective means for adjusting the clamping-bars with relation to each other their adjacent faces at one or more points may be toothed, forming rack-bars, as indicated at $D^2$, Figs. 2 and 3, and a pinion-key F, Fig. 4, is adapted to seat between and engage therewith in order to adjust the bars longitudinally with relation to each other. This key F may or may not form a permanent part of the structure; but in any event it is preferably inserted through the rim, as indicated in Fig. 1, and when the clamps have been adjusted it may be removed and retained until other adjustment is necessary.

In lieu of moving the clamping-bars longitudinally in spreading them it is obvious that they may be given a direct transverse-movement, and in Fig. 5 a means is shown whereby this may be accomplished. In said Fig 5 the bars are indicated by the letter G as parallel bars, and between them at suitable intervals keys H are interposed, said keys H being journaled on the rims and each having a short and a long dimension. When said keys are turned so that the short dimension is presented to the bars, the latter are free to move toward each other a sufficient distance to permit of the insertion or removal of the projections or enlargements on the tire; but when said keys are turned to present their long dimensions to the bars the latter will be spread a sufficient distance to clamp the enlargements or projections on the tire. In other words, by spreading the clamping-bars the channels in which the projections on the tire fit are reduced in width and the said projections are firmly clamped and held so as to prevent the escape of the tire from the rim.

It is preferred that the tire should embody in its construction a canvas or fabric surface adjacent the rim and clamp, as indicated at K, and as an additional safeguard against the withdrawal of the enlargement on the tire from the undercut channel the said enlargement may be provided with transverse stays or wires L, the ends of the latter underlying the overhanging walls formed by the outer sides or edges of the clamping-bars and inner sides of the rim. In order to retain the bars in their proper relative positions, they may be provided with retainers—such, for instance, as the clips M—formed on one of the bars, with their ends seating and working in grooves N on the other bar, the grooves extending in a plane parallel with the plane of movement of the bars when adjusted, as before described.

With the construction described it is obvious that the insertion or removal of a tire from the rim is an exceedingly simple matter, inasmuch as it is only necessary to first release the clamping-bars or move them so as to reduce the distance between their outer edges, then place the tire in position, and finally spread the clamping-bars so as to clamp the projections or enlargements on the tire in the channels formed between the clamping-bars and edges of the rim. Bars of the character described may be formed to present no corners or angles in which an inner tube will be pinched or caught when a tire is placed in position, and as a consequence difficulties heretofore encountered in placing double-tube tires in position with clamping devices as heretofore used are entirely obviated.

Having thus described my invention, what I claim as my invention, and desire to secure by Letters Patent, is—

1. In a vehicle-tire, the combination with the undercut channeled rim and elastic tire having projections fitting the undercut portions of the rim, of relatively transversely movable clamping-bars in said channel arranged to move in the same plane between the projections of the tire and means for moving said bars transversely against the projections to clamp the projections between the bars and the rim; substantially as described.

2. In a vehicle-tire, the combination with the undercut channeled rim and elastic tire having projections fitting the undercut portions of the rim, of two parallel clamping-bars located in the rim between the projections and movable transversely in opposite directions in the same plane and means for moving said bars transversely to force their outer edges against the projections of the tire to clamp said projections between the rim and the bars; substantially as described.

3. In a vehicle-tire, the combination with the undercut channeled rim and elastic tire seating in said rim, of transversely-movable clamping-bars located in the channel of the rim and forming with the undercut channel-rim channels for the base portion of the tire and a key seating between the proximate faces of said bars for moving the same against the base portion of the tire to clamp the tire between said bars and undercut rim; substantially as described.

4. In a vehicle-tire, the combination with the undercut channeled rim and the elastic tire seating in said rim, of transversely-movable clamping-bars located in the channel of the rim and having their outer edges inclined or undercut forming with the undercut channels in the rim channels with undercut walls for the reception of the base portions of the tire and a key seating between the proximate faces of said bars for moving the same against the base portions of the tire to clamp the same between the bars and the rim; substantially as described.

5. In a vehicle-tire, the combination with the undercut channeled rim and elastic tire having projections seating in said undercut portions of parallel clamping-bars having their outer faces undercut, forming with the undercut channeled rim, recesses for the reception of the base portions of the tire, coöperating opposite inclines on the proximate faces of the same bars, racks on the proximate faces of said bars and a pinion-key coöperating with said racks to move the bars longitudinally and spread the same against the base portions of the tire to clamp the tire between the bars and rim; substantially as described.

JAMES ALLEN SWINEHART.

Witnesses:
CHARLES MOTZ,
H. J. SAUNDERS.